May 19, 1959
G. POOLE
2,887,031
REMOVABLE AIR CONDITIONING UNITS FOR AUTOMOBILES
Filed Nov. 26, 1956
2 Sheets-Sheet 1
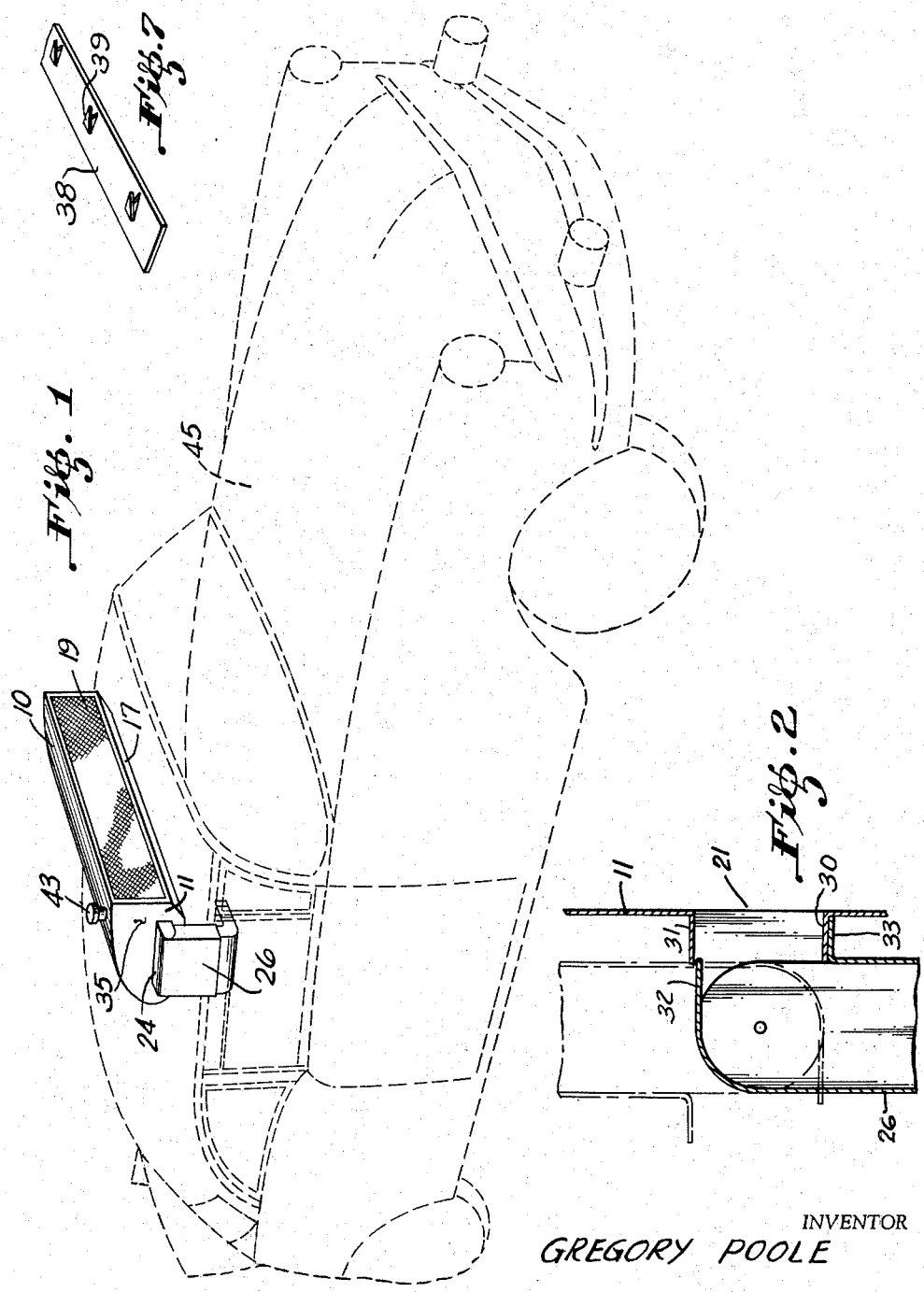
INVENTOR
GREGORY POOLE
BY
Wilkinson, Mawhinney & Theibault
ATTORNEYS May 19, 1959  G. POOLE  2,887,031
REMOVABLE AIR CONDITIONING UNITS FOR AUTOMOBILES
Filed Nov. 26, 1956  2 Sheets-Sheet 2
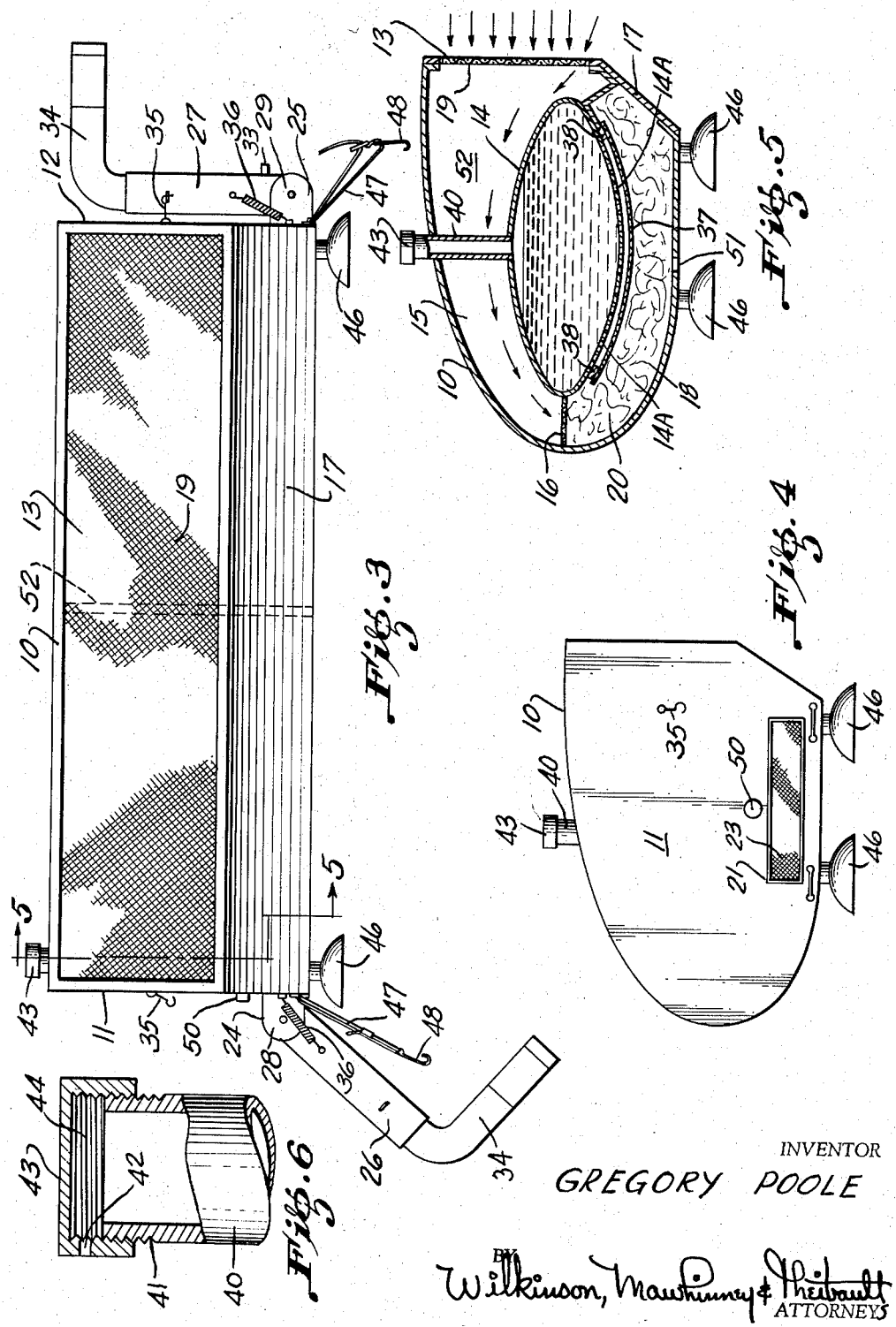
INVENTOR
GREGORY POOLE

2,887,031
REMOVABLE AIR CONDITIONING UNITS FOR AUTOMOBILES

Gregory Poole, Phoenix, Ariz.

Application November 26, 1956, Serial No. 624,280

5 Claims. (Cl. 98—2)

The present invention relates to removable air conditioning units for automobiles and has for an object to provide an air conditioner which may be instantly installed and removed from an automobile not requiring any permanent connections or defacing the automobile body.

Another object of the invention is to provide an air conditioner light in weight, easy to install and which has no moving parts requiring constant adjustment or replacement as with units employing fans, compressors, etc.

A further object of my invention is to provide an air conditoner the discharge ducts of which may be elevated above the top of the car door when not in use.

A still further object of my invention is to provide a liquid coolant reservoir of the gravity feed type in which the rate of feed flow of the coolant to the diffuser and fibrous absorbent material may be regulated with ease from the outside of the unit to control the cooling rate for air passing thereover and to avoid filling the fibrous material compartment with coolant fluid which may be blown directly into the automobile in its liquid state.

A further object of the present invention is to provide a device of the character described having vehicle intake ducts which may be easily inserted into and out of the vehicle window and rocked to an up position and there locked when not in use and which may be so related with the main casing as to reduce or cut off the supply of cooled air directed thereto when the duct is in the raised or up position.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a perspective view of a removable air conditioning unit for automobiles shown attached to an automobile indicated in dotted lines.

Figure 2 is a fragmentary front elevational view taken at an enlarged scale with parts broken away and parts shown in section of the hinged duct structure.

Figure 3 is a front elevational view of a unit constructed in accordance with the present invention.

Figure 4 is a side elevational view of the unit of Figure 3 taken from the left hand end thereof with the vehicle inlet duct removed.

Figure 5 is a transverse section taken on the lines 5—5 in Figure 3.

Figure 6 is an enlarged view of the filling cap construction with parts broken away and parts shown in section.

Figure 7 is an inverted perspective view of a section of one of the diffuser retaining members employed with the present invention.

Referring more particularly to the drawings and for the moment to Figures 3 through 6 inclusive, 10 designates generally a casing having end walls 11 and 12. The casing is as shown in Figure 5 substantially parabolic in longitudinal section, having an air inlet opening 13 at its forward end. Supported by and secured to the end walls 11 and 12 is a liquid coolant reservoir 14 of elliptical section. This reservoir is positioned to form an air intake chamber 15 of reduced area from forward aft and cooperates with a screen 16 and a plate 17 to define a cooling chamber 18.

The air intake chamber 15 is provided at its mouth with a screen 19 to restrict flying objects from entering the unit. The screen may be secured in place by removable fasteners to permit access to the unit or replacement of the screen 19 when damaged in use.

The screen 16 and plate 17 cooperate with the casing 10 and reservoir tank 14 to define the cooling chamber 18 and to confine the porous fibrous absorbent material such as excelsior 20.

Duct openings 21 are provided in the end walls 11 and 12 and are generally rectangular in section having a screen 23 to confine the excelsior. The duct openings 21 are located above the bottom wall of the casing to prevent coolant liquid from being blown into the vehicle.

Cooperating with the duct openings 21 are two duct stubs 24, 25 secured to the end walls 11 and 12 as by welding or otherwise. These stubs 24, 25 cooperate with the vehicle ventilation supply ducts 26, 27, which are of the same cross-section, and are joined thereto by pivots 28, 29 as shown in Figure 2. The pivots are secured to the stub ducts. Each stub duct is provided with flanges 30, 31, which cooperate with flanges 32 and 33 on the main duct to deflect the air discharged from the unit in the desired path to the vehicle. The ducts 26, 27 leading to the vehicle have a projection 34 extending beyond the duct body whereby to cut off the cooling from the air chamber 18 when the duct is raised to the position of the right hand duct in Figure 3. The ducts 26, 27 are retained in the raised or elevated condition by hooks or the like fastenings 35 and may also be aided with springs 36.

Referring more particularly to Figure 5, the elliptically shaped coolant reservoir 14 is provided with a plurality of openings 14A in the bottom thereof over the outside of which is stretched a diffuser or canvas 37. The canvas 37 is of the water absorbent specie and is anchored to the bottom of the reservoir tank 14 by inverted strips 38 having pointed teeth 39 extending therefrom which are forced through the canvas 37 to retain the canvas tightly against the bottom of the tank 14.

Beneath the canvas 37 is a bed of excelsior 20 which absorbs water or other coolant fed from the reservoir tank 14 to the canvas 37 through openings 14A. The excelsior 20 is confined by screens 16, 23 and the removable plate 17.

The tank 14 is provided with a filling connection 40 having a threaded end portion 41. Cooperating with the threaded end 41 of the filling connection 40 is a cap 43 having an opening 42 and threads 44 mating with the threaded portion 41 of the filling connection 40.

The unit is adapted to be supported upon the top of a vehicle 45 (shown in dotted lines in Figure 1) and to rest upon suction cups 46 and be retained in place by straps 47 having hooks 48 which cooperate with the drain gutter on the vehicle.

In operation the unit may be applied to a vehicle as follows:

The canvas diffuser 37 is first placed under and tightly against the openings 14A in the reservoir tank 14, forcing the teeth 39 of strips 38 through the canvas.

The excelsior is then placed in the unit and the cover plate 17 secured in place by screws or otherwise.

The unit is then placed upon the top of the vehicle and the suction cups 46 seated in position and the hooks 48 applied to the drain gutter of the vehicle and the straps 47 drawn taut.

The cap 43 on the filling connection 40 is removed and the reservoir tank 14 is filled with water or other coolant after which the cap 43 is then screwed down tight upon the end of the filling connection 40 closing the opening 42 and trapping the water or coolant in the tank 14. When it is desired to use the unit the cap 43 is backed off to open the opening 42 to put the contents of the tank 14 in communication with atmosphere and to permit the contents of the tank 14 to escape through the openings 14A at the bottom thereof and saturate and be diffused by the canvas 37 to be absorbed by the excelsior. The rate of coolant liquid flow from the tank 14 to the excelsior 20 may be controlled and stopped by screwing the cap 43 to vary the port area of opening 42.

The inlet ducts are then unhooked and the ducts inserted into the vehicle windows.

The parabolic shape of the casing cooperates with the elliptical shape of the tank 14 to form a throat or diminishing area to increase the velocity of air through the screen into the excelsior compartment where the coolant liquid in the excelsior 20 absorbs heat from the incoming air by the process of evaporation and the cooled air is then discharged throught the openings 21 in the end walls 11, 12 of the casing into the ducts 26, 27 and thence into the vehicle.

It will be noted that when the unit is employed in a passenger vehicle that due to the average high speed of travel forward the rate of air flow into the car will be sufficient to not require the vehicle to be sealed. In fact an air outlet will be necessary. It has been found that with the window of the vehicle rolled up against the duct and with the duct tight against the top of the door frame, the width of the duct being less than the width of the window adequate air escape is attained. However; when applied to heavy trucks on mountain runs or hilly runs over a desert area it will become necessary to seal the window all the way around the duct and to provide a discharge opening at a suitable place in the cab of the tractor and to insert an exhaust blower in the opening to pull a slight vacuum in the cab of the tractor to pull air through the ducts and from the cooling chamber of the unit. This is necessary where the over the ground speed of the truck is slow due to load and terrain. Under slow speed conditions the ram effect of the air into the unit is lost. This condition is not generally true with the average passenger vehicle which may attain an average cruising speed of sixty miles per hour.

Upon completion of the journey when it is desired to remove the unit from the vehicle it will be of assistance if the tank 14 is provided with a drain plug 50 at one side thereof proximate its bottom. Upon opening the plug 50 the contents of the tank will be discharged and lessen the weight of the unit.

An opening or openings 51 may be provided in the bottom of the casing 10 to drain off excess coolant liquid which may accumulate to prevent the deposit of coolant from rising above the lip on the side wall and entering the vent duct.

The unit may be provided with a central partition 52 dividing the intake into two halves to reduce any transverse air swirls or turbulence which may develop from cross winds in travel of the vehicle.

Although I have disclosed herein the best form of the invention known to me at this time, I reserve the right to all such modifications and changes as may come within the scope of the following claims.

What is claimed is:

1. In an air conditioning unit for use with an automobile having a permanent top and windows, a housing adapted to be removably secured to the automobile top, said housing being generally parabolic in configuration with the apex thereof directed toward the rear end of said automobile, an air intake opening formed in said housing on the side opposite said apex, a reservoir positioned within said housing having a generally elliptical configuration and adapted to contain a cooling liquid therein, said reservoir being spaced from said housing to define therewith an upper air inlet chamber and a lower cooling chamber, said air inlet chamber communicating with said air intake opening for receiving air upon forward motion of said automobile and including an air exit throat formed between said housing and reservoir adjacent the rearward side of said reservoir, said cooling chamber communicating with said air exit throat for receiving air therefrom, means at the forward side of said reservoir connected to said housing and spanning the space between the housing and reservoir to close off the forward side of said cooling chamber, a mass of absorbent material disposed in said cooling chamber, the lower wall of said reservoir being formed with discharge openings for allowing liquid to gravitate from said reservoir into the absorbent material located in the cooling chamber, and duct means communicating with said cooling chamber and adapted to be inserted into the interior of said automobile through said windows for conveying air cooled by passage from said air inlet chamber through said cooling chamber.

2. In an air conditioning unit for use with an automobile having a permanent top and windows, a housing adapted to be removably secured to the automobile top and having an air intake opening formed on the forward side thereof, a reservoir positioned within said housing adapted to contain a cooling liquid and spaced from the walls thereof to define therewith an upper air inlet chamber and a lower cooling chamber, said air inlet chamber communicating with said air intake opening for receiving air upon forward motion of said automobile and including an air exit throat formed between said housing and reservoir adjacent the rearward side of said reservoir, said cooling chamber communicating with said air exit throat for receiving air therefrom, means at the forward side of said reservoir connected to said housing and spanning the space between the housing and reservoir to close off the forward end of said cooling chamber, said cooling chamber having a mass of absorbent material disposed therein, discharge openings formed on the lower wall of said reservoir for allowing liquid to gravitate from said reservoir into said absorbent material, and duct means communicating with said cooling chamber and adapted to be inserted into the interior of said automobile through said windows for conveying air cooled by passage from said air inlet chamber through said cooling chamber.

3. In an air conditioning unit as defined by claim 2, wherein said duct means are hingedly secured to opposite ends of said housing, and project through the window openings on opposite sides of the automobile into the interior thereof when in normal operative position, said duct means being pivotally movable upwardly away from the window openings into a retracted position when not in use, and means for retaining said duct means in the retracted position.

4. In an air conditioning unit as defined by claim 2, which include means for filling the reservoir with liquid, said filling means comprising a pipe communicating with the top of the reservoir, and a removable cap threadedly engaging the upper end of the pipe, said cap having an air port formed in one side thereof and providing communication between the reservoir and the outside atmosphere, whereby regulation of the opening of the port by movement of the cap controls the rate of seepage of the liquid through the discharge openings into the cooling chamber.

5. In an air conditioning unit as defined by claim 2, which includes a plurality of teeth projecting from the lower wall of said reservoir, and an absorbent sheet removably secured to the underside of said reservoir by said teeth which are adapted to be impaled therein.

References Cited in the file of this patent

UNITED STATES PATENTS

| | | |
|---|---|---|
| 373,763 | Ayer | Nov. 22, 1887 |
| 1,988,262 | Burckhalter et al. | Jan. 15, 1935 |
| 2,223,884 | Bolan | Dec. 3, 1940 |
| 2,453,018 | Kercheval | Nov. 2, 1948 |
| 2,594,636 | Gazda | Apr. 29, 1952 |
| 2,700,927 | Jordan | Feb. 1, 1955 |